United States Patent [19]  [11] 4,154,891
Porter, Jr. et al.  [45] May 15, 1979

[54] NOVEL THERMOSETTING RESINOUS COMPOSITIONS

[75] Inventors: Samuel Porter, Jr., Tarentum; Roger L. Scriven, Gibsonia; Wen-Hsuan Chang, Gibsonia; James B. O'Dwyer, Gibsonia, all of Pa.

[73] Assignee: PPG Industries, Inc., Pittsburgh, Pa.

[21] Appl. No.: 775,067

[22] Filed: Mar. 7, 1977

[51] Int. Cl.$^2$ ............... C08G 61/24; C08G 61/28
[52] U.S. Cl. .................. 428/334; 260/29.4 R; 260/29.4 UA; 260/39 R; 260/849; 260/850; 260/851; 260/856; 428/524
[58] Field of Search ............ 260/850, 849, 856, 851, 260/852, 29.4 R, 29.4 UA; 428/334

[56] References Cited

U.S. PATENT DOCUMENTS

| | | | |
|---|---|---|---|
| 2,915,486 | 12/1959 | Shelley | 260/21 |
| 3,352,806 | 11/1967 | Hicks | 260/29.4 |
| 3,455,859 | 7/1969 | Korpman | 260/852 |
| 3,535,183 | 10/1970 | Marriott et al. | 156/232 |
| 3,542,718 | 11/1970 | Davis et al. | 260/31.4 |
| 3,597,495 | 8/1971 | Sekmakas et al. | 260/850 |
| 3,673,148 | 6/1972 | Vasta | 260/850 |
| 3,773,710 | 11/1973 | Victurius | 260/856 |
| 3,862,261 | 1/1975 | Stoddard | 260/850 |
| 3,912,790 | 10/1975 | Chang et al. | 260/850 |
| 3,919,351 | 11/1975 | Chang et al. | 260/850 |
| 3,954,899 | 5/1976 | Chang et al. | 260/850 |
| 3,962,167 | 6/1976 | Martorano | 260/29.4 UA |
| 4,021,505 | 5/1977 | Wang | 260/850 |

*Primary Examiner*—John C. Bleutge
*Attorney, Agent, or Firm*—William J. Uhl

[57] ABSTRACT

Novel thermosetting resinous compositions are disclosed. The compositions comprise the reaction product of a polymeric polyol having a cured glass transition temperature less than 20° C. with a substantial stoichiometric excess of an aminoplast curative. The cured compositions are hard with good durability and surprising flexibility for such high aminoplast loadings.

These compositions are particularly useful as coatings for resilient and rubbery substrates such as foam rubber, polyurethane foam and vinyl foam and on soft metal surfaces such as mild steel and aluminum.

16 Claims, No Drawings

NOVEL THERMOSETTING RESINOUS COMPOSITIONS

BACKGROUND OF THE INVENTION

1. Field of the Invention

This invention relates to resinous compositions, particularly coating compositions, and to coated substrates. More particularly, this invention relates to coating compositions containing polymeric polyols cured with an aminoplast and which are hard, durable and which have surprising flexibility.

2. Brief Description of the Prior Art

Coating compositions comprising hydroxyl-containing polymers in combination with an aminoplast curing agent are well known in the art. Usually these compositions are prepared with an approximate stoichiometric amount of aminoplast curing agent. For hard, durable coatings, the hydroxyl number of polymeric polyol is relatively high and relatively high amounts of aminoplast curing agent are used. However, these hard, durable coatings are very rigid having relatively poor flexibility, particularly poor low temperature flexibility. For flexible coatings, the prior art has suggested relatively low loadings of aminoplast (on a percentage by weight basis). However, coatings prepared with these low aminoplast loadings do not have outstanding durability, nor hardness. It has been found in the practice of the present invention that hard, durable coatings with a surprising degree of flexibility can be prepared by curing polymeric polyols having low cured glass transition temperatures and preferably having a low hydroxyl functionality (as determined by hydroxyl value) with a substantial stoichiometric excess of an aminoplast curative.

SUMMARY OF THE INVENTION

In accordance with the present invention, it has been found that in order to obtain elastomeric coatings with good durability, flexibility and hardness, careful control over the cured glass transition temperature of the polymeric polyol, stoichiometric excess of aminoplast curing agent and level of aminoplast (expressed as weight percentage) must be exercised. The resinous composition comprises:

(A) a polyol component containing at least 25 percent of a non-gelled polymeric polyol selected from the class, including mixtures thereof, consisting of polyester polyols, polyether polyols and polyurethane polyols, said non-gelled polymeric polyol having a hydroxyl value of less than 50 and a cured glass transition temperature less than 0° C., (B) at least a 1000 percent stoichiometric excess of amine-aldehyde condensate based on total equivalents of polyol, said amine-aldehyde condensate being present in said resinous composition in an amount of 35 to 60 percent by weight based on total weight of (A) and (B).

The invention also provides for a paint composition comprising the thermosetting resinous compositions described above in combination with a pigment and a liquid diluent present in an amount sufficient to provide a viscosity suitable for coating applications.

The present invention also provides for coated articles in which both flexible and rigid substrates are coated with the cured resinous compositions described above.

PERTINENT PRIOR ART

There are many patents dealing with polymeric polyols in combination with aminoplast resins. However, heretofore, the criticality of using an equivalent excess of aminoplast with a polymeric polyol of low cured glass transition temperature was not known. Representative examples of prior art dealing with the use of aminoplast in curing hydroxyl-containing polymers is U.S. Pat. No. 2,915,486 to Shelley dealing with polyester polyols; U.S. Pat. No. 3,352,806 to Hicks; U.S. Pat. No. 3,535,183 to Marriott et al; and U.S. Pat. No. 3,773,710 to Victorius; all dealing with aminoplast curatives for acrylic polyols.

The Victorius patent is of particular interest because it discloses an acrylic polyol component which is a mixture containing a polyol of low glass transition temperature of $-20°$ to $-80°$ C. and a polyol of high glass transition temperature of greater than $-20°$ to about 40° C. The patent, however, does not teach using a stoichiometric excess of amine-aldehyde as is used in the present invention. In fact, the working examples show amine-aldehyde stoichiometric excesses from as low as 54 percent in Example 1, to as high as 34 percent in Example 3. In addition, the resinous compositions of Victorius use much lower percentages by weight aminoplast than the resinous composition of the invention. In Victorius, 5–30 percent aminoplast is recommended, indicating flexibility can be obtained only at low aminoplast levels. With such low aminoplast loadings, although good flexibility is attained, the hardness and durability, particularly dirt pick up on exposure, suffer somewhat. The resinous coating compositions of the present invention, on the other hand, are designed for higher aminoplast levels, that is, 35 to 60 percent by weight, and as such, produce hard, durable coatings while maintaining good flexibility.

U.S. Pat. Nos. 3,912,790 and 3,954,899 to Chang and Hartman both disclose elastomeric coating compositions prepared from polyurethane polyols and aminoplast curatives. Optionally, polymeric polyols may be present as plasticizers. However, these patents do not teach using a stoichiometric excess of aminoplast curatives in combination with polyols of low cured glass transition temperatures.

Of particular note are U.S. Pat. No. 3,542,718 to Davis and U.S. Pat. No. 3,862,261 to Stoddard. The Davis patent discloses poly(etherurethane) polyols cured with an amine-aldehyde condensate and specifically discloses that there should be about 0.50 to 5 alkoxyalkylamino compound equivalents for each hydroxyl group of the polyurethane polyol. Thus, even though Davis indicates that up to a 400 percent stoichiometric excess of amine-aldehyde condensate can be used, this excess is far lower than that required by the present invention.

U.S. Pat. No. 3,862,261 to Stoddard discloses hard, abrasion-resistant, inflexible coatings for thermoplastic substrates such as polycarbonates. The coating composition comprises a melamine resin, a polyol which can be a polyethylene or a polypropylene glycol and a polyurethane diol. The weight ratio of melamine resin to polyurethane is about 8 to 1 and the polyol to polyurethane weight ratio about 2.5 to 1 to 1. Although the Stoddard patent discloses no criticality in using a stoichiometric excess of melamine to polyol, the working examples of the patent can be interpreted as having an 800 percent stoichiometric excess of melamine resin to total polyol. However, Stoddard does not disclose nor do the working examples show a polyol component containing at least 25 percent of a non-gelled polymeric polyol having a cured glass transition temperature less than 20° C. in combination with melamine loadings of 35 to 60 percent as required by the present invention. The Stoddard compositions have relatively high weight percentages of aminoplast in their compositions, that is, about 70 to 80 percent based on total weight of aminoplast and polyol. As such, although the Stoddard coating compositions have good hardness and abrasion resistance, they do not have the good flexibility, particularly low temperature flexibility, such as the compositions of the present invention.

DETAILED DESCRIPTION

The polyol component can be selected from polyurethane polyols, which are preferred, polyester polyols, hydroxyl-containing acrylic polymers and polyether polyols.

Examples of polyether polyols are polyalkylene ether polyols which include those having the following structural formula:

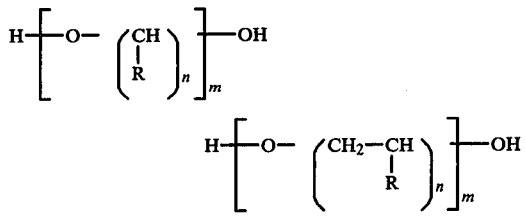

where the substituent R is hydrogen or lower alkyl containing from 1 to 5 carbon atoms including mixed substituents, and n is typically from 2 to 6 and m is from 10 to 100 or even higher. Included are poly(oxytetramethylene) glycols, poly(oxyethylene) glycols, poly-(oxy-1,2-propylene) glycols and the reaction products of ethylene glycol with a mixture of 1,2-propylene oxide and ethylene oxide.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, for example, ethylene or propylene oxide, in the presence of an acidic or basic catalyst.

With polyether polyol, it is preferred that the carbon to oxygen weight ratio be high for better hydrophobic properties of the coating. Thus, it is preferred that the carbon to oxygen ratio be greater than 3/1 and more preferably greater than 4/1.

Polyester polyols can also be used as the polyol component of the invention. Polyester polyols can be prepared by the polyesterification of an organic polycarboxylic acid or anhydride thereof with organic polyols and/or an epoxide. Usually, the polycarboxylic acids and polyols are aliphatic or aromatic dibasic acids and diols.

The diols which are usually employed in making the polyester include alkylene glycols, such as ethylene glycol, neopentyl glycol and other glycols such as hydrogenated Bisphenol A, cyclohexanediol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality can also be used. Examples include trimethylolpropane, trimethylolethane, pentaerythritol and the like, as well as higher molecular weight polyols such as those produced by oxyalkylating lower molecular weight polyols. An example of such a higher molecular weight polyol is the reaction product of 20 moles of ethylene oxide per mole of trimethylolpropane. Some monofunctional alcohols such as normal propyl alcohol and normal butyl alcohol can be used in the polyesterification.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, decanoic acid, dodecanoic acid, and other dicarboxylic acids of varying types. The polyester may include minor amounts of monobasic acids such as benzoic acid, stearic acid, acetic acid, hydroxystearic acid and oleic acid. Also, there may be employed higher polycarboxylic acids such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsilon-caprolactone and a polyol. Such products are described in U.S. Pat. No. 3,169,945 to Hostettler, and the portion of this patent relating to the description of polycaprolactone polyols being incorporated by reference. While not disclosed in the aforementioned patent, the product of a lactone with an acid-containing polyol such as described in U.S. Pat. No. 4,098,743 can also be used.

In addition to the polyether and polyester polyols, hydroxy-containing acrylic polymers or acrylic polyols can be used as the polyol component.

Among the acrylic polymers are interpolymers of about 0.2 to 10 percent by weight hydroxy-containing vinyl monomers such as hydroxyalkyl acrylate and methacrylate having 2 to 6 carbon atoms in the alkyl group and 90 to 99.8 percent by weight of other ethylenically unsaturated copolymerizable materials such as alkyl acrylates and methacrylates; the percentages by weight being based on the total weight of the monomeric charge.

Examples of suitable hydroxyalkyl acrylates and methacrylates are acrylic acid and methacrylic acid esters of ethylene glycol and propylene glycol. Also useful are hydroxy-containing esters and/or amides of unsaturated acids such as maleic acid, fumaric acid, itaconic acid and the like.

Examples of suitable alkyl acrylates and methacrylates are lauryl methacrylate, 2-ethylhexyl methacrylate and n-butyl acrylate.

Besides the acrylates and methacrylates, other copolymerizable monomers which can be copolymerized with the hydroxyalkyl acrylates and methacrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate and mixtures thereof. Usually these other ethylenically unsaturated materials are used in admixture with the above-mentioned acrylates and methacrylates.

Besides the above-mentioned polymeric polyols, polyurethane polyols can also be used, and their use is preferred. These polyols can be prepared by reacting any of the above-mentioned polyols with a minor amount of polyisocyanate (OH/NCO equivalent ratio greater than 1:1) so that free hydroxyl groups are present in the product. In addition to the high molecular weight polyols mentioned above, mixtures of both high molecular weight and low molecular weight polyols may be used. Among the low molecular weight polyols are diols and triols such as aliphatic polyols including alkylene polyols containing from 2 to 18 carbon atoms. Examples include ethylene glycol, 1,4-butanediol, 1,6-hexanediol; cycloaliphatic polyols such as 1,2-hexanediol and cyclohexanedimethanol. Examples of triols include trimethylolpropane and trimethylolethane. Also useful are polyols containing ether linkages such as diethylene glycol and triethylene glycol. Also, acid-containing polyols such as dimethylolpropionic acid can also be used.

The organic isocyanate which is used to prepare the polyurethane polyols can be an aliphatic or an aromatic isocyanate or a mixture of the two. Aliphatic isocyanates are preferred since it has been found that these provide better color stability in the resultant coating. Also, diisocyanates are preferred although higher polyisocyanates and monoisocyanates can be used in place of or in combination with diisocyanates. Where higher functionality polyisocyanates are used, some reactive material to reduce the functionality of the polyisocyanate may be used, for example, alcohols and amines. Also, some monofunctional isocyanate may be present. Examples of suitable higher polyisocyanates are 1,2,4-benzene triisocyanate and polymethylene polyphenyl isocyanate. Examples of suitable monoisocyanates are butyl isocyanate, cyclohexyl isocyanate, phenyl isocyanate and toluene isocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed and are actually preferred because of color stability and imparting hardness to the product. Examples include 1,4-cyclohexyl diisocyanate, isophorone diisocyanate, alpha, alpha-xylene diisocyanate and 4,4'-methylene-bis-(cyclohexyl isocyanate). This particular isocyanate is preferred and is commercially available from E. I. duPont de Nemours and Company under the trademark HYLENE W ®.

Preferably, the polyol component contains a polyurethane polyol, because it has been found that resinous vehicles prepared with polyurethane polyols having a cured glass transition temperature less than 20° C. and preferably less than 0° C. and a hydroxyl value less than 50 and preferably at least a 1000 percent equivalent excess of an aminoplast curative have an outstanding combination of hardness and flexibility, particularly low temperature flexibility. This combination of properties makes the resinous vehicles particularly good for coating both elastomeric such as foamed thermoplastic polyurethane, as well as metal substrates such as steel and aluminum. Thus, the resinous vehicles can be applied to automobiles and trucks for coating both metal and elastomeric parts.

In the practice of the invention, not all of the polyols will provide the outstanding properties as do the polyurethane polyols. However, in many applications, such outstanding properties are not needed and, therefore, the invention is also seen to be applicable to other active hydrogen-containing polymers such as acrylic, polyester and polyether polyols.

To be useful in the practice of the invention, the polymeric polyols should be "soft" having low cured glass transition temperatures (cured $T_g$) of less than 20°, preferably less than 0°, and more preferably less than $-20°$ C. The term "cured glass transition temperature" means the glass transition temperature as measured with a penetrometer such as a duPont 940 Thermomedian Analyzer (TMA), of a cured material of about 1 to 3 mils in thickness, free of solvent and cured by the following method: The material in which the cured $T_g$ is to be measured is mixed with 160 grams of hexakis(methoxymethyl)melamine per one gram-equivalent of a hydroxyl-containing polymer and 0.5 percent by weight based on total solids of para-toluene sulfonic acid. The mixture is drawn down with a 3-mil drawbar and cured at 300° F. (149° C.) for 30 minutes. The glass transition temperature is then measured on this cured composition.

Preferably, the polymeric polyols are of low hydroxyl functionality and have hydroxyl values as determined by ASTM E-222-76, Method B (reflux one hour) of 50 or less, usually within the range of 4 to 50, preferably 40 or less, more preferably 30 or less, and most preferably from 4 to 30; the hydroxyl value being determined on polymeric polyol solids, exclusive of solvents, solubilizing and neutralizing agents. Polymeric polyols having hydroxyl values increasingly much above 50 are not preferred because of increasing brittleness and poorer impact resistance in resultant cured coatings, particularly at low temperature.

The polymeric polyols having the required low cured glass transition temperature should constitute at least 25, preferably greater than 50, more preferably at least 60 and most preferably at least 90 percent by weight of the polyol component in order to obtain a flexible coating, particularly at low temperature. The remaining portions of the polyol component can be selected from low molecular weight polyols such as polyol monomers and oligomers and polymeric polyols having higher cured glass transition temperatures.

The polyol component described above is mixed with an aminoplast or amine-aldehyde condensate to provide the major components of the compositions of the invention. Amine-aldehyde condensates obtained from the reaction of formaldehyde with melamine, urea or benzoguanamine are most common and are preferred in the practice of the invention. However, condensates or other amines and amides can be employed, for example, aldehyde condensates of diazines, triazoles, guanidines, guanamines and alkyl and aryl di-substituted derivatives of such compounds including alkyl and aryl substituted ureas and alkyl and aryl substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,4,6-triethyltriamine-1,3,5-triazine and the like.

While the aldehyde employed is most often formaldehyde, other aldehydes such as acetaldehyde, crotonaldehyde, benzaldehyde and furfuryl may be used.

The amine-aldehyde condensation products contain methylol or similar alkylol groups, and in most instances at least a portion of these alkylol groups are etherified by reaction with an alcohol to provide organic solvent-soluble resins. Any monohydric alcohol can be employed for this purpose, including such alcohols as methanol, ethanol, butanol, and hexanol, as well as aromatic alcohols such as benzylol alcohol, cyclic aliphatic alcohols such as cyclohexanol, monoethers of glycols such as CELLOSOLVES and CARBITOLS and halogen substituted alcohols such as 3-chloropropanol.

Preferably, the amine-aldehyde condensate contains methylol or similar alkylol groups. These materials homopolymerize more readily and have been found to be preferred in the practice of the invention. Aminoplasts which are completely alkylated can be used in the practice of the invention, although their use is not preferred. If they are used, reaction temperatures must be sufficiently high, that is, about 250° F. (121° C.) and sufficient catalyst present to insure the production of a suitable product. An example of a suitable catalyst is para-toluene sulfonic acid. Amine-aldehyde condensates which do not readily homopolymerize, that is, the fully alkylated materials, generally give softer films (if the film is cured under the same conditions).

It is necessary that the amine-aldehyde condensate and the polymeric polyol be reactive and compatible with one another. By reactive is meant that when the resinous composition is applied as a coating to a substrate, it will undergo a chemical reaction at room or elevated temperature, optionally in the presence of catalyst to form a thermoset coating which is hard, durable and flexible. By compatible is meant that upon mixing the amine-aldehyde condensate and polyol, a uniform mixture is obtained. The mixture can be clear or cloudy but a two-layer phase-separated system cannot be employed in the practice of the invention. Compatibility is important from the point of view of obtaining cured films. When it is desired to obtain clear films, clear mixtures are desired. With pigmented films of low gloss, compatibility is not that much of a problem and cloudy mixtures can be tolerated. To aid in compatibility, the polyol component as described above should preferably have an acid value as determined by ASTM D-1639-70 of about 5 to 30.

With regard to the amounts of polyol and amine-aldehyde condensate employed in the practice of the invention, the amine-aldehyde condensate should comprise at least a 650 percent stoichiometric excess over the stoichiometric amount required to react with total equivalents of polyol. Preferably, the amine-aldehyde condensate comprises at least a 1000 percent and most preferably at least a 1500 percent stoichiometric or equivalent excess. The stoichiometric excess or equivalent excess is based on a calculated value of the hydroxy reactive equivalency or functionality of the amine-aldehyde condensate as determined from either the theoretical structure or from the nuclear magnetic resonance spectrum (NMR). When the amine-aldehyde condensate is a resinous product in which the theoretical structure cannot be determined with accuracy, then NMR can be used to determine the equivalent weight and equivalency of the amine-aldehyde condensate.

The principle involved in determining the equivalent weight of the amine-aldehyde condensate by NMR involves measuring the area under the NMR signal due to the hydrogen in the aldehyde portion of the amine-aldehyde condensate. For example, when the amine-aldehyde condensate is formed from some amine or amide condensed with formaldehyde, the methylene groups derived from the formaldehyde in the melamine resin would include $-CH_2N-$, $-CH_2O-$, $-OCH_2N-$ and $-NCH_2N-$. These methylene groups give proton NMR signals in the region around 4.5 to about 5.5 ppm down field from TMS (tetramethylsilane used as reference for chemical shift). The area of the $CH_2$ signals is directly proportional to the quantity of $CH_2$ groups present in the resin.

To avoid interference from NMR signals of solvents present in the amine-aldehyde condensates, toluene is used as an external reference material. Both the toluene and amine-aldehyde condensate NMR spectra are recorded under identical experimental conditions. The integrated area of the $CH_2$ groups of melamine resin is compared directly to the area of the methyl groups ($CH_3$) of toluene. The equivalent weight of the resin per mole of $CH_2$ is calculated directly from the ratio of the area in a known concentration of toluene.

Besides the equivalent excess, the percentage by weight of the amine-aldehyde condensate in the resinous composition is also important for the properties of the cured resinous composition. The amine-aldehyde condensate should constitute from 35 to 60, preferably 35 to 55 percent by weight of the resinous composition, with the polyol component constituting from 40 to 65, preferably 45 to 65 percent by weight of the resinous composition.

When the aminoplast is present in amounts lower than 650 percent equivalent excess and constitutes much less than 35 percent by weight of the resinous component, the hardness and durability of the resultant coating composition suffers. Also, the aminoplast should not be present in loadings much higher than 60 percent by weight of the resinous coating composition because of the loss of flexibility of the resultant coatings obtained with such high aminoplast loadings.

The resinous compositions of the invention are usually employed in paint compositions which, besides the resinous component, additionally contain pigment and a liquid vehicle for the resin. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the paint is usually expressed as a pigment-to-resin weight ratio. In the practice of the present invention, the pigment-to-resin weight ratios are as high as 2:1 and, for most pigmented coatings, are within the range of about 0.05 to 1:1.

For organic solvent based coating applications, particularly spray coating applications, the intrinsic viscosity (a measure of molecular weight) of the polymeric polyol is important. Accordingly, the polymeric polyol should have an intrinsic viscosity within the range of 0.1 to 1.1, preferably 0.2 to 0.6.

The intrinsic viscosity of the polyol component is determined by art-recognized methods. The polyol is dissolved in N-methyl pyrrolidone or other suitable solvent at a concentration of from 8 to 30 percent. The solution is further thinned with dimethyl formamide to 0.5 and 0.25 percent concentrations. The solutions may then be passed through a capillary viscometer to determine the reduced viscosities. The intrinsic viscosity will then be determined by the following equation:

$$[\mu] = [\mu reduced]_{C=O} = [\mu reduced]_{0.25} + [[\mu reduced]_{0.25} - [\mu reduced]_{0.50}] = 2[\mu reduced]_{0.25} - [\mu reduced]_{0.50}$$

where C stands for concentration, $[\mu]$ is intrinsic viscosity and $[\mu reduced]_{0.25}$ is the reduced viscosity of a 0.25 percent concentration and $[\mu reduced]_{0.50}$ is the reduced viscosity of a 0.50 percent concentration. The general methods of determining reduced viscosity are described in the art such as TEXTBOOK OF POLYMER SCIENCE, Billmeyer, Interscience Publishers, New York, 1957, pages 79–81. Intrinsic viscosities within the required range provide the optimum sprayabilities. The sprayability of a resinous coating composition is defined as the maximum concentration of resin solids in solution such that the resinous solution can be atomized sufficiently to form a uniformly deposited coating. Above the maximum concentration, the spraying solution strings and gives a web-like spray pattern. Sprayabilities are determined using an air suction spray gun operating at 60 psi with a No. 30 air cap. The sprayability must be high enough to get a reasonable film build in a short period of time. Thus, the sprayabilities should be 15 percent or greater. However, the sprayability should not be too high in that spray-applied coatings prepared from resins which have too high a sprayability have a tendency to sag and run. In organic solvent-based systems, sprayabilities that are too high indicate a polymeric polyol of relatively low intrinsic viscosity. With organic solvent-based coating systems employing such polymers, it is very difficult to orient properly metallic pigment to give the lustrous metallic colors. Thus, the sprayability is preferably 40 percent or less for such coating systems. The same considerations do not apply for polymeric dispersions such as polymeric dispersions in non-solvents such as water or organic medium.

For coating applications, a liquid diluent is usually present in the composition. By liquid diluent is meant a solvent or non-solvent which is volatile and is removed after the coating is applied and is needed to reduce viscosity sufficiently to enable forces available in simple coating techniques, that is, brushing and spraying, to spread the coating to controllable, desired and uniform thicknesses. Also, diluents assist in substrate wetting, resinous component compatibility, package stability and coalescence or film formation. Generally, a diluent is present in the composition in amounts of about 20 to 90, preferably 50 to 80 percent by weight based on total weight of diluent and resinous component, although more diluent may be employed depending on the particular coating application. Examples of suitable liquid diluents include aromatic hydrocarbons such as toluene and xylene, ketones such as methyl ethyl ketone and methyl isobutyl ketone, alcohols such as isopropyl alcohol, normal butyl alcohol, monoethers of glycols such as the CELLOSOLVES and CARBITOLS, water and compatible mixtures thereof.

When water is employed as a diluent either alone or in admixture with water-miscible solvents, the compositions of the invention should be modified so that they are dispersible in the aqueous diluent. This can be accomplished by the use of externally added emulsifier incorporating water-solubilizing groups such as ethylene oxide moieties or ionic salt groups into one or more of the components of the present invention. Examples of suitable ionic salt groups are:

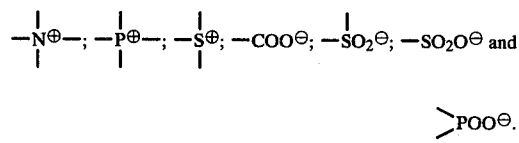

The ionic salt groups can be incorporated into the components of the coating compositions by techniques well known in the art. They may be present in the polymeric polyol, in the amine-aldehyde condensate or in both. For example, where the polymeric polyol is a polyester or an acrylic, it can easily be prepared with unreacted acid groups which can then be neutralized to form acid salt groups. When the polymeric polyol is a polyurethane, the ionic salt groups can be incorporated by techniques disclosed in U.S. patent application Ser. No. 582,946, filed June 2, 1975, to Scriven and Chang, and in U.S. Pat. No. 3,479,310 to Dieterich et al.

In addition to the above ingredients, various fillers, plasticizers, anti-oxidants, ultraviolet light absorbers, flow control agents, surfactants and other formulating additives can be employed if desired. These materials are optional and generally constitute up to 70 percent by weight based on total solids.

The coating compositions of the invention can be applied by conventional methods including brushing, dipping, flow coating, etc., but they are most often applied by spraying. Usual spray techniques and equipment are utilized. They can be applied virtually over any substrate including wood, metal, glass, cloth, plastics, foams, and the like, as well as over various primers. The coatings are particularly useful on resilient and rubbery substrates, such as foam rubber, polyurethane foam, and vinyl foam, and on soft metal surfaces such as mild steel and aluminum. In general, the coating thickness will vary somewhat depending upon the application desired. In general, coatings from about 0.1 to 5 mils have been found to be useful in most applications.

After application to a substrate, the coatings are cured. Curing can be at room temperature up to 500° F. (260° C.). In most cases, the cure schedule is from about 5 to 60 minutes at 140°–260° F. (60–127° C.). Higher or lower temperatures with correspondingly shorter or longer times can be utilized, although the exact cure schedule best employed depends upon the nature of the substrate as well as the particular components of the composition. As mentioned above, amine-aldehyde condensates which do not readily homopolymerize generally require higher reaction temperatures. Acid catalysts and other curing catalysts can be added to aid in curing if desired; these can permit the use of lower temperature and/or shorter times.

The following examples illustrate the invention. All quantities are on a weight basis unless otherwise indicated.

EXAMPLE 1

A low hydroxyl value poly(ester-urethane) polyol was prepared from the following charge:

| Ingredient | Parts by Weight |
|---|---|
| methyl isobutyl ketone | 18.90 |
| PCP 0241X[1] | 42.90 |
| dimethylolpropionic acid | 0.72 |
| HYLENE W[2] | 6.38 |
| butanone oxime | 0.33 |
| n-butanol | 0.69 |
| isopropyl alcohol | 0.69 |
| methyl ethyl ketone | 23.39 |

[1]Polycaprolactone polyol commercially available from Union Carbide having a molecular weight of 2000.
[2]4,4'-methylene-bis-(cyclohexyl isocyanate) commercially available from E. I. duPont de Nemours and Company.

The methyl isobutyl ketone, PCP 0241X, dimethylolpropionic acid and HYLENE W were charged to a reaction vessel under a nitrogen atmosphere and heated at 110° C. until a Gardner-Holdt viscosity of 12.8 seconds was reached. The viscosity was measured by taking a sample of the resin and thinning with 45 parts per 100 parts of resin of methyl ethyl ketone. A Gardner-Holdt viscosity tube was filled with the thinned resin and inverted. The time it takes for a bubble to travel the length of the inverted tube is the measured viscosity.

After the required viscosity was obtained, the butanone oxime, isopropyl alcohol and butanol were then added followed by the addition of methyl ethyl ketone.

The product had a solids content of 50 percent, a Gardner-Holdt viscosity of V, an acid value of 8-10 (based on resin solids), a hydroxyl number of 20 based on resin solids and a cured $T_g$ of −44° C.

The poly(ester-urethane) reaction product prepared as described above was formulated into a coating composition in the following charge ratio:

| Ingredient | Parts by Weight |
|---|---|
| poly(ester-urethane) polyol | 78.0 |
| pigment paste[3] | 113.0 |
| CYMEL 370[4] | 51.0 |
| anti-cratering agent[5] | 15.0 |
| diethanolamine | 0.3 |
| catalyst[6] | 3.0 |
| solvent mixture[7] | 70.0 |

[3]The pigment paste employed is ground in a solution of a polyester made from 703 parts of 1,6-hexanediol, 482 parts of adipic acid, 821 parts of isophthalic acid, 8.6 parts of hydroxyethyl ethylene imine, 442 parts of trimethylolpropane. The paste is produced by mixing the following:

| Ingredient | Parts by weight |
|---|---|
| polyester (60% solids in 82:18 weight ratio of methyl butyl ketone and toluene) | 73.01 |
| TiO$_2$ | 208.98 |
| isobutyl acetate | 21.04 |
| methyl ethyl ketone | 10.51 |
| diacetone alcohol | 10.51 |

| Ingredient | Parts by weight |
|---|---|
| anti-settling agent[a] | 5.23 |

[a]Anti-settling agent, 40% by weight polyethylene powder sold by Solmet Solvey as AC 629 in xylene. The mixture is ground in a ball mill until the particles have a fineness of about 7½ Hegman.
[4]Mixed methylated, butylated melamine-formaldehyde resin commercially available from American Cyanamid Comany. The product has an equivalent weight of 87. The equivalent excess of amine-aldehyde condensate to total polyol is 1330 percent and the amine-aldehyde condensate is present in the resinous composition in an amount of 45.4 percent by weight.
[5]The "anti-cratering agent" is prepared from the following charge:

| Ingredient | Parts by Weight |
|---|---|
| 25% by weight solution of cellulose acetate butyrate[a] in a blend of 75/25 weight ratio of methyl isobutyl ketone and n-butanol | 4 |
| silicone fluid solution[b] | 1 |
| TINUVIN 328[c] | 2 |
| IRGANOX 1035[d] | 2 |
| solvent mixture[7] | 6 |

[a]Commercially available from Eastman Kodak as CAB 551–0.2.
[b]½% by weight solution of Dow Corning 100 centi-stokes silicone fluid sld commercially as D.C 200 in xylene solvent.
[c]Substituted benzotriazole, ultraviolet light absorber commercially available from Ciba-Geigy.
[d]Thiodiethylene bis-(3,5-di-tert-butyl-4-hydroxy) hydrocinnamate, anti-oxidant and thermal stabilizer commercially available from Ciba-Geigy. This additive and the substituted benzotriazole mentioned in (c) do not contribute anti-cratering activity but are included with the solvent mixture (7).
[6]7.5% by weight cyclohexyl sulfamic acid solution in isopropanol.
[7]Solvent mixture constitutes the following:

| Solvent | Parts by Volume |
|---|---|
| methyl ethyl ketone | 30 |
| ethyl acetate | 30 |
| isopropyl acetate | 20 |
| 2-ethoxy ethyl acetate | 20 |

The coating composition had good storage stability and excellent properties as reported in Table I below.

EXAMPLE 1-A

The following example shows the preparation of a coating composition which is the preferred embodiment of the invention.

A low hydroxyl value poly(ester-urethane) polyol was prepared from the following charge:

| Ingredient | Parts by Weight |
|---|---|
| PCP-0230[1] | 39.26 |
| dimethylolpropionic acid | 1.19 |
| HYLENE W | 9.56 |
| methyl isobutyl ketone | 18.29 |
| methyl ethyl ketone | 31.46 |
| monoethanolamine | 0.23 |
| dibutyltin dilaurate | 0.003 |

[1]Polycaprolactone polyol having a molecular weight of 1250 commercially available from Union Carbide Corporation.

The methyl isobutyl ketone, PCP-0230, dimethylolpropionic acid and HYLENE W were charged to a reaction vessel under a nitrogen atmosphere and heated at 110° C. until a Gardner-Holdt viscosity of 12.9 seconds was reached. The viscosity was measured by taking a sample of the resin and thinning with 46 parts per 100 parts of resin of methyl ethyl ketone. A Gardner-Holdt viscosity tube was filled with the thinned resin and inverted. The time it takes for a bubble to travel the length of the inverted tube is the measure of viscosity.

After the required viscosity was obtained, the monoethanolamine was then added followed by the addition of the methyl ethyl ketone.

The product had a solids content of 49.8 percent, a Gardner-Holdt viscosity of V+, an acid value of 9.8 based on resin solids and a hydroxyl number of 18.8 based on resin solids, and a cured $T_g$ of $-42°$ C.

The poly(ester-urethane) reaction product prepared as described above was formulated into a coating composition in the manner described in Example 1. The coating composition had the same weight percentage and stoichiometric excess of amine-aldehyde condensate as in Example 1. The coating composition had good storage stability and excellent properties as reported in Table I below.

EXAMPLE 2

A coating composition similar to Example 1 was prepared but without pigment. The coating composition had the following charge ratio:

| Ingredient | Parts by Weight |
| --- | --- |
| poly(ester-urethane) polyol of Example 1 | 98.0 |
| CYMEL 370 | 57.0 |
| anti-cratering agent of Example 1 (including ultraviolet light stabilizer, anti-oxidant and thermal stabilizer) | 15.0 |
| diethylamine | 0.3 |
| catalyst of Example 1 | 3.0 |
| solvent mixture of Example 1 | 77.0 |

The equivalent excess of CYMEL 370 to poly(ester-urethane) polyol is 6450 percent, and the CYMEL 370 constituted 50.6 percent by weight of the resinous composition.

The coating composition had good storage stability and excellent physical properties as reported in Table I below.

EXAMPLE 3

An unpigmented coating composition similar to Example 2 was prepared with the exception that a low hydroxyl value poly(ether-urethane) polyol was used in place of the poly(ester-urethane) polyol. The coating composition had the following charge ratio:

| Ingredient | Parts by Weight |
| --- | --- |
| poly(ether-urethane)[8] polyol | 119.0 |
| CYMEL 370 | 57.0 |
| anti-cratering agent of Example 2 | 19.0 |
| diethanolamine | 0.3 |
| catalyst of Example 1 | 3.0 |
| solvent mixture of Example 1 | 56.0 |

[8]The low hydroxyl value poly(ether-urethane) polyol was prepared from the following charge:

| Ingredient | Parts by Weight |
| --- | --- |
| POLYMEG 970[e] | 1248 |
| dimethylolpropionic acid | 83.6 |
| methyl isobutyl ketone | 621.6 |
| HYLENE W | 450 |
| dibutyltin dilaurate | 0.07 |
| n-butanol | 40 |
| ethyl acetate | 1076.9 |
| hydroxyethyl ethylene imine | 54 |
| dimethylethanolamine | 15 |
| ethyl acetate | 810 |

[e]Polyoxytetramethylene glycol having a molecular weight of 970, commercially available from Quaker Oats Company.

The POLYMEG 970, dimethylolpropionic acid and methyl isobutyl ketone were charged to a reaction vessel under a nitrogen atmosphere and stirred to produce a smooth slurry. The HYLENE W and dibutyltin dilaurate were then charged to the reaction vessel at a temperature below 40° C. The reaction mixture was heated to 60° C. and held at this temperature for one hour followed by heating to 100° C. and holding for two hours. The butanol was then added and the reaction mixture held at 100° C. for four hours followed by reducing the temperature to 70° C. and adding the first portion of ethyl acetate. The Gardner-Holdt bubble viscosity of this particular reaction mixture was 87.5 seconds. The product had an acid value of 10.5. At a temperature of 70° C., the hydroxyethyl ethylene imine was added and the reaction temperature held at 70° C. for two hours. The acid value was 2.7 and the Gardner-Holdt bubble viscosity was 463.2 seconds. The dimethylethanolamine and the second portion of ethyl acetate was added to produce a product having a Gardner-Holdt bubble viscosity of 52.4 seconds.

The product had a solids content of 42 percent, an acid value of 9.36 based on resin solids, a hydroxyl number of 19.3 based on resin solids and a cured $T_g$ of $-52°$ C. The equivalent ratio of amine-aldehyde condensate (CYMEL 370) to poly(ester-urethane) polyol in the coating composition was 38.1. The CYMEL 370 constituted 50 percent of the resinous composition. The coating composition had good storage stability and excellent physical properties as reported in Table I below.

EXAMPLE 4

An unpigmented coating composition similar to Example 2 was prepared with the exception that a low hydroxyl value poly(acrylic-urethane) polyol was used in place of the poly(ester-urethane) polyol and a monomeric butylated melamine-formaldehyde condensate was used in place of the CYMEL 370. The coating composition had the following charge ratio:

| Ingredient | Parts by Weight |
| --- | --- |
| poly(arcylic-urethane)[11] polyol | 104.0 |
| butylated melamine-formaldehyde condensate[9] | 82.0 |
| anti-cratering agent of Example 2 | 15.0 |
| diethanolamine | 0.3 |
| catalyst[10] | 0.5 |
| solvent mixture of Example 1 | 49.0 |

[9]Butylated melamine-formaldehyde condensate sold commercially by Monsanto Company as MR-219. Product has equivalent weight of 150. The equivalent excess of butylated melamine-formaldehyde condensate to poly(urethane-acrylic) polyol is 13,800 percent. MR-219 constituted 50.5 percent by weight of the resinous composition.
[10]Para-toluenesulfonic acid.
[11]The low hydroxyl value poly(acrylic-urethane) polyol was prepared from the following charge:

| Ingredient | Parts by Weight |
| --- | --- |
| HYLENE W | 1.33 |
| acrylic polyol[f] | 88.93 |
| dibutyltin dilaurate | 0.0016 |
| n-butanol | 2.67 |
| isopropyl alcohol | 6.22 |
| monoethanolamine | 0.124 |

The HYLENE W, acrylic polyol and dibutyltin dilaurate were charged to a reaction vessel under the nitrogen. The mixture was heated with stirring at 108° C. until a Gardner-Holdt bubble viscosity of 5.2 seconds was reached. For measuring viscosity, the reaction mixture was thinned with 75 parts per 100 parts of resin of toluene. After attaining the required viscosity, the butanol, monoethanolamine and isopropyl alcohol were added.

The product had a solids content of 47.1 percent, a Gardner-Holdt viscosity of U-V, an acid value of 14.3 based on resin solids, an OH value of 4.5 based on resin solids and a cured $T_g$ of $-43°$ C.

| *The acrylic polyol was prepared from the following charge: Ingredient | Parts by Weight |
|---|---|
| butyl acrylate | 53.80 |
| hydroxyethyl acrylate | 0.55 |
| acrylic acid | 1.11 |
| VAZO[g] | 0.17 |
| toluene | 44.37 |

[g]Azobisisobutyronitrile commercially available from E. I. duPont de Nemours and Company.

The toluene was first charged to a reaction vessel under a nitrogen blanket. The VAZO was dissolved in the monomer charge and this solution added over a three-hour period to the toluene at 90° C. with stirring. The reaction mixture was maintained at 90° C. for an additional hour.

The product had a solids content of 51.8 percent, a Gardner-Holdt viscosity of I-J, an acid value of 16.4 based on resin solids and a hydroxyl value of 5.3 based on resin solids.

The coating composition had good storage stability and excellent physical properties as reported in Table I below.

EXAMPLE 5

An unpigmented coating composition similar to Example 2 was prepared with the exception that a monomeric butylated melamine-formaldehyde condensate was used in place of CYMEL 370. The coating composition had the following charge ratio:

| Ingedient | Parts by Weight |
|---|---|
| poly(ester-urethane) of Example 1 | 98.0 |
| butylated melamine-formaldehyde condensate of Example 4 | 82.0 |
| anti-cratering agent of Example 2 | 15.0 |
| diethanolamine | 0.3 |
| catalyst of Example 1 | 3.0 |
| solvent mixture of Example 1 | 52.0 |

The coating composition had good storage stability and excellent physical properties as reported in Table I below. The equivalent excess of the butylated melamine-formaldehyde condensate of Example 4 to poly(ester-urethane) polyol is 5370 percent. The butylated melamine-formaldehyde condensate constituted 50.5 percent by weight of the resinous composition.

EXAMPLE 6

An unpigmented coating composition similar to Example 2 was prepared with the exception that hexakis(methoxymethylol)melamine was used in place of CYMEL 370 and no diethanolamine was present in the charge. The coating composition had the following charge ratio:

| Ingredient | Parts by Weight |
|---|---|
| poly(ester-urethane) of Example 1 | 128.0 |
| CYMEL 303[10] | 35.0 |
| anti-cratering agent of Example 2 | 15.0 |
| catalyst of Example 1 | 0.5 |
| solvent mixture of Example 1 | 71.5 |

[10]Hexakis(methoxymethylol)melamine commercially available from American Cyanamid Company.

The equivalent excess of CYMEL 303 to poly(ester-urethane) polyol is 4300 percent. The CYMEL 303 constituted 36 percent by weight of the resinous composition. The coating composition had good storage stability and excellent physical properties as reported in Table I below.

EXAMPLE 7

A low hydroxyl value water-dispersed poly(ester-urethane) polyol was prepared from the following charge:

| Ingredient | Parts by Weight |
|---|---|
| PCP-0230[11] | 24.70 |
| HYLENE W | 7.26 |
| dimethylolpropionic acid | 1.48 |
| N-methylpyrrolidone | 14.33 |
| hydrazine | 0.10 |
| dimethylethanolamine | 0.96 |
| deionized water | 51.17 |

[11]PCP-0230 polycaprolactone diol commercially available from Union Carbide Corporation having a molecular weight of 1250.

The PCP-0230, HYLENE W, dimethylolpropionic acid and N-methylpyrrolidone were charged to a reaction vessel under nitrogen and heated to 110° C. Heating was continued until the reaction mixture attained a Gardner-Holdt bubble viscosity of 4.6 seconds when the reaction mixture was thinned with 40 parts by weight of methyl ethyl ketone per 100 parts by weight of the reaction mixture. The warmed resinous reaction product was then added with stirring to a mixture of water, hydrazine and dimethylethanolamine.

The product has a solids content of 32.2 percent, a Gardner-Holdt viscosity of less than A, an acid value of 25.6 based on resin solids, a hydroxyl number of 37 based on resin solids and a cured $T_g$ of $-40°$ C.

The poly(ester-urethane) reaction product prepared as described above was formulated into a coating composition in the following charge ratio:

| Ingredient | Parts by Weight |
|---|---|
| poly(ester-urethane) polyol | 143.0 |
| CYMEL 370 | 57.0 |
| FC-430[12] | 1.0 |
| catalyst of Example 1 | 1.5 |
| butyl CARBITOL[13] | 10.0 |
| TEXANOL[14] | 5.0 |
| deionized water | 2.0 |

[12]10% solution in water-fluorocarbon surfactant commercially available from 3MCompany.
[13]Monobutyl ether of diethylene glycol.
[14]2,2,4-trimethylpentanediol-1,3-monoisobutyrate.

The coating composition had good storage stability and excellent physical properties as reported in Table I below. The equivalent excess of CYMEL 370 to poly(ester-urethane) polyol is 2060 percent, and the CYMEL 370 constituted 51.5 percent by weight of the resinous composition.

EXAMPLE 8

An unpigmented coating composition similar to Example 2 was prepared with the exception that a urea-formaldehyde resin was used in place of the CYMEL 370. The coating composition had the following charge ratio:

| Ingredient | Parts by Weight |
|---|---|
| poly(ester-urethane) polyol of Example 1 | 100.0 |
| urea-formaldehyde resin[15] | 83.0 |
| anti-cratering agent of Example 2 | 4.0 |

-continued

| Ingredient | Parts by Weight |
|---|---|
| catalyst of Example 1 | 3.0 |
| solvent mixture of Example 1 | 60.0 |

[15]Urea-formaldehyde resin commercially available from Rohm & Haas Company as F-240.

The equivalent excess of urea-formaldehyde resin to poly(ester-urethane) polyol is 8040 percent and the urea-formaldehyde resin constituted 50 percent by weight of the resinous composition.

The coating composition had good storage stability and excellent physical properties as reported in Table I below.

The equivalent excess of urea-formaldehyde resin to poly(ester-urethane) polyol is 8040 percent and the urea-formaldehyde resin constituted 50 percent by weight of the resinous composition.

The coating composition had good storage stability and excellent physical properties as reported in Table I below.

Table I

Physical Properties of Polyurethane Substrates Coated with Compositions of Examples 1–8[16]

| Ex. No. | Sward Hardness[17] | Elongation Tensile[18] | −20° F. Bend[19] | Humidity Resistance[20] |
|---|---|---|---|---|
| 1 | 22 | 43%/3408 psi | no breaks | no blistering, no loss of gloss |
| 1-A | 16 | 59%/4200 psi | " | " |
| 2 | 16 | 130%/3550 psi | " | " |
| 3 | 16 | 273%/3692 psi | " | " |
| 4 | 10 | 28%/10 psi | " | " |
| 5 | 10 | 178%/3124 psi | " | " |
| 6 | 4 | 138%/1207 psi | " | " |
| 7 | 26 | 95%/4544 psi | " | " |
| 8 | 14 | 88%/3237 psi | " | " |

[16]3-mil coating on ⅛ inch thermoplastic polyurethane commercially available from Mobay Company as TEXIN 3202.
[17]Sward Hardness determined by using a Sward Rocker as described in Organic Coating Technology, Payne, Vol. 1, 1965, pages 642–643.
[18]Elongation and tensile determined according to ASTM D-639-72 on free films.
[19]−20° F. bend determined by taking a coated substrate cooled to −20° F. and bending it 180° around a ½ inch (1.13 cm) mandrel (coating side outwardly facing). After bending, the coating is examined for breaks and cracks.
[20]Humidity resistance determined by using the coated substrates as the ceiling of a humidity chamber (QCT chamber) with the coating directed inwardly to the chamber. The chamber is heated to 140° F. (60° C.) and about a 2 inch (9 cm) level of water is located 3 to 5 inches below the coated panel (panel sloped).

We claim:

1. A thermosetting resinous composition which, when applied to a substrate and cured, produces a hard, durable, flexible coating; comprising a compatible reaction mixture of:
   (A) a polyol component containing at least 25 percent of a non-gelled polymeric polyol selected from the class including mixtures thereof consisting of polyester polyols, polyether polyols and polyurethane polyols said non-gelled polymeric polyol having a hydroxyl value of less than 50 and a cured glass transition temperature less than 0° C.,
   (B) at least a 1000 percent stoichiometric excess of an amine-aldehyde condensate based on total equivalents of polyol, said amine-aldehyde condensate being present in said resinous composition in an amount of 35 to 60 percent by weight based on total weight of (A) and (B).

2. The thermosetting resinous composition of claim 1 in which the polymeric polyol has a cured $T_g$ of less than −20° C.

3. The thermosetting resinous composition of claim 1 in which the amine-aldehyde condensate is present in at least a 1500 percent stoichiometric excess.

4. The thermosetting resinous composition of claim 1 in which the polyol component contains water-solubilizing groups.

5. The thermosetting resinous composition of claim 1 in which the amine-aldehyde condensate contains alkanol groups.

6. The thermosetting resinous composition of claim 5 in which the amine-aldehyde condensate is a condensate of melamine and formaldehyde.

7. A thermosetting resinous composition which, when applied to a substrate and cured, produces a hard, durable, flexible coating; comprising a compatible reaction mixture of:
   (A) a polyol component containing at least 50 percent of a non-gelled polyurethane polyol having a cured glass transition temperature less than 0° C. and a hydroxyl value less than 50,
   (B) at least a 1000 percent stoichiometric excess of an amine-aldehyde condensate based on total equivalents of polyol, said amine-aldehyde condensate being present in said resinous composition in an amount of 35 to 60 percent by weight based on total weight of (A) and (B).

8. A coated article comprising:
   (A) a substrate, and
   (B) a cured resinous coating adhered thereto; the cured resin comprising the reaction product of the resinous composition of claim 1.

9. A coated article comprising:
   (A) a substrate, and
   (B) a cured resinous coating adhered thereto; the cured resin comprising the reaction product of the resinous composition of claim 7.

10. The coated article of claim 8 in which the coating has a thickness of 0.1 to 5 mils.

11. The coated article of claim 8 in which the substrate is selected from the class consisting of wood, metals, glass, cloth, plastics and foams.

12. The coated article of claim 8 in which the coating is pigmented.

13. A paint composition comprising:
   (A) the thermosetting resinous composition of claim 1,
   (B) a pigment,
   (C) a liquid vehicle present in an amount sufficient to provide the paint composition with a sufficiently low viscosity for coating applications.

14. A paint composition comprising:
   (A) the thermosetting resinous composition of claim 7,
   (B) a pigment,
   (C) a liquid vehicle present in an amount sufficient to provide the paint composition with a sufficiently low viscosity for coating applications.

15. The composition of claim 13 in which the pigment-to-resin weight ratio is within the range of 0.05 to 1.5:1.

16. The composition of claim 13 in which the polyol component of the resinous composition contains water-solubilizing groups and the liquid vehicle contains water.

* * * * *

UNITED STATES PATENT AND TRADEMARK OFFICE
CERTIFICATE OF CORRECTION

PATENT NO. : 4,154,891

DATED : May 15, 1979

INVENTOR(S) : Samuel Porter, Jr. et al

It is certified that error appears in the above-identified patent and that said Letters Patent are hereby corrected as shown below:

Column 12, line 22, "sld" should be --sold--.

Column 14, line 38, "arcylic" should be --acrylic--.

Column 16, line 46, "2.0" should be --20.0--.

Column 17, line 29, "10 psi" should be --710 psi--.

Signed and Sealed this

Tenth Day of November 1981

[SEAL]

Attest:

GERALD J. MOSSINGHOFF

Attesting Officer

Commissioner of Patents and Trademarks